United States Patent [19]

Chen et al.

[11] Patent Number: 5,224,969

[45] Date of Patent: * Jul. 6, 1993

[54] DIAMOND HAVING MULTIPLE COATINGS AND METHODS FOR THEIR MANUFACTURE

[75] Inventors: Sy-Hwa Chen, Columbia, S.C.; Jeffrey S. Hansen, Salt Lake City, Utah

[73] Assignee: Norton Company, Worcester, Mass.

[ * ] Notice: The portion of the term of this patent subsequent to Jun. 30, 2009 has been disclaimed.

[21] Appl. No.: 868,071

[22] Filed: Apr. 13, 1992

Related U.S. Application Data

[63] Continuation-in-part of Ser. No. 556,069, Jul. 20, 1990, Pat. No. 5,126,207.

[51] Int. Cl.$^5$ .................................. D24D 11/00
[52] U.S. Cl. ............................. 51/295; 51/307; 51/309; 428/408; 428/429
[58] Field of Search ................ 51/295, 307, 309; 428/408, 429

[56] References Cited

U.S. PATENT DOCUMENTS

| | | | |
|---|---|---|---|
| 3,528,788 | 9/1970 | Seal | 51/295 |
| 3,596,649 | 8/1971 | Olivieri | 125/11 |
| 3,650,714 | 3/1972 | Farkas | 51/295 |
| 3,757,878 | 9/1973 | Wilder et al. | 175/329 |
| 3,826,630 | 7/1974 | Roy | 29/195 |
| 3,841,852 | 10/1974 | Wilder et al. | 51/295 |
| 3,871,840 | 3/1975 | Wilder et al. | 51/295 |
| 3,879,901 | 4/1975 | Caveney | 51/295 |
| 3,924,031 | 12/1975 | Nicholas et al. | 51/295 |
| 3,929,432 | 12/1975 | Caveney | 51/295 |
| 4,011,064 | 3/1977 | Lee et al. | 51/295 |
| 4,142,869 | 3/1979 | Vereschagin et al. | 51/309 |
| 4,184,853 | 1/1980 | Otopkov et al. | 51/295 |
| 4,278,448 | 7/1981 | Ishizuka et al. | 51/295 |
| 4,378,975 | 4/1983 | Tomlinson et al. | 51/309 |
| 4,396,677 | 8/1983 | Intrater et al. | 428/408 |
| 4,399,167 | 8/1983 | Pipkin | 427/217 |
| 4,403,015 | 9/1983 | Nakai et al. | 428/565 |
| 4,411,672 | 10/1983 | Ishizuka | 51/309 |
| 4,435,189 | 3/1984 | Bovenkerk | 51/295 |
| 4,605,343 | 8/1986 | Hibbs, Jr. et al. | 407/119 |
| 4,766,040 | 8/1988 | Hiller et al. | 428/552 |
| 4,776,862 | 10/1988 | Wiand | 51/293 |
| 4,776,863 | 10/1988 | Berg et al. | 51/295 |
| 4,837,089 | 6/1989 | Araki et al. | 428/552 |
| 4,842,937 | 6/1989 | Meyer et al. | 428/408 |
| 4,859,531 | 8/1989 | Tsuji et al. | 428/333 |
| 4,895,770 | 1/1990 | Schintlmeister et al. | 428/552 |
| 4,968,326 | 11/1990 | Wiand | 51/293 |
| 5,011,514 | 4/1991 | Cho et al. | 51/295 |
| 5,024,680 | 6/1991 | Chen et al. | 51/309 |

FOREIGN PATENT DOCUMENTS

| | | |
|---|---|---|
| 0272197 | 6/1980 | European Pat. Off. . |
| 0012631 | 6/1988 | European Pat. Off. . |
| 1574515 | 2/1969 | France . |
| 158110495/-PN | 7/1983 | Japan . |
| 0712057 | 7/1954 | United Kingdom . |

*Primary Examiner*—mark L. Bell
*Assistant Examiner*—Willie J. Thompson
*Attorney, Agent, or Firm*—Stephen L. Borst

[57] ABSTRACT

A diamond element having good bonding properties and a method for fabricating the diamond element in which a diamond substrate is coated by and bonded to a first layer of chromium carbide, a second layer containing titanium, vanadium, zirconium, niobium, tantalum, iron, cobalt, nickel or copper, is bonded to said first layer, and a third layer of tungsten, or molybdenum deposited by a CVD technique utilizing metal halides, is bonded to said second layer. The second layer functions to protect the chromium carbide layer against attack by halide containing gas during the CVD deposition of the tungsten, or molybdenum.

9 Claims, No Drawings

5,224,969

DIAMOND HAVING MULTIPLE COATINGS AND METHODS FOR THEIR MANUFACTURE

This application is a continuation-in-part of co-pending application Ser. No. 07/556,069 filed Jul. 20, 1990, now U.S. Pat. No. 5,126,207, the benefit of the filing date of which is hereby claimed.

FIELD OF THE INVENTION

The present invention relates to diamond with multiple coatings for improved retention in a matrix.

BACKGROUND OF THE INVENTION

Diamond is widely used in sawing, drilling, dressing, and grinding applications. The diamond is typically bonded to or mechanically held in a matrix of nickel, copper, iron, cobalt, or tin, or alloys thereof which is connected to a tool body. The matrix can also comprise a resin, such as phenol formaldehyde.

When the diamond is in the form of an abrasive grit, it is frequently mechanically bonded in the matrix with the matrix surrounding the grit and holding it in place. While simple and practical, mechanical bonds are relatively weak and the grit can be easily lost as the surrounding matrix is abraded away during use. Grit retention can be improved by embedding the grit deeply cutting efficiency. In a typical saw blade application, the average exposure of diamond grit is less than 20% of the total grit height. Grit loss can become a serious problem when the supporting matrix is worn down such that over one-third of the grit is exposed. The average lifetime of such cutting tools is decreased as up to two-thirds of the original diamond grit are prematurely lost.

From U.S. Pat. No. 3,871,840, it is known that a tungsten coating deposited on a diamond particle enhances the ability of a matrix material, such as bronze or a bronze alloy, to adhere to the diamond particle and thereby to retain the particle in a tool during the use of the tool in abrading, cutting or grinding use.

Additionally, in an attempt to improve grit retention, it has been known to coat diamond particles with carbide forming transition metals such as titanium or zirconium. The coating's inner surface forms a carbide with the diamond. A second layer of a less oxidizable metal, such as nickel or copper, can then be applied to protect the inner layer from oxidation.

Tensile testing of double layer coated diamond having an inner layer such as chromium and an outer layer such as nickel shows that fracturing occurs at the interface between the inner and outer metal layers. This suggests that nickel does not alloy or otherwise bond well with the underlying carbide and that double layer coated grits may not significantly improve overall grit retention. Bonding can also be weakened by oxidation of the inner chromium layer during the nickel coating process.

It is also known to coat diamond particles with titanium, manganese, chromium, vanadium, tungsten, molybdenum or niobium by metal vapor deposition. It has been found, however, that these carbide formers do not bond strongly enough to the diamond crystals to improve their grit retention for many high stress applications, or they are susceptible to oxidation. As discussed above, the outer metal layers used to protect inner layers from oxidation do not adequately bond to the inner layer.

As illustrated in copending, commonly owned U.S. Pat. No. 5,024,680, the disclosure of which is hereby incorporated by reference, attempts have been made to further improve the bonding strength between a matrix and diamond particles by first coating the diamond particles with chromium and then depositing a coating of tungsten on the chromium by a chemical vapor deposition technique. A typical CVD technique is to levitate or tumble the chrome coated diamond in a vapor. The vapor is typically composed of tungsten hexafluoride. It has been discovered however, that while favorable results have been achieved by this process, there is an unfortunate tendency for the fluorine containing gas to react detrimentally with the chromium containing coating to produce chromium fluoride. Therefore, for CVD depositions utilizing tungsten hexafluoride, the strength of the layered system is limited by the presence of the chromium fluoride between the chromium carbide and the tungsten layer.

SUMMARY OF THE INVENTION

It has been discovered that the retention of diamond may be enhanced by first depositing a layer (i.e., a first layer) of metal onto a diamond substrate. The metal of said first layer is selected to react with the carbon of the diamond substrate to form a metal carbide. Onto this first layer is deposited a second layer. The second layer is selected from a material which forms a strong bond with the surface of the first layer and which is resistant to attack by a halide containing gas but which is different from the material of the first layer. It has been discovered that candidate materials for the second layer may be selected from the group including iron, cobalt, nickel or copper, and nitrides of titanium, vanadium, zirconium, niobium, or tantalum. Finally, a third layer of a transition element also different from the material of the second layer is deposited on said second layer.

More specifically, the process includes depositing a first layer of chromium on the material to form a chrome carbide layer, then depositing a second layer of titanium, vanadium, zirconium, niobium or tantalum on to the chrome carbide layer. The second layer is then nitrided. Alternatively, the second layer may include iron, cobalt, nickel or copper which are resistant to halide attack without having to be nitrided. Finally, a layer of tungsten, or molybdenum is deposited on top of the nitride containing layer. The intermediate layer not only bonds exceptionally well to both the underlying chromium carbide and to the overlying tungsten, but it forms a protective barrier against attack by the halide (fluorine for example) containing gas on the chromium carbide during the tungsten deposition process. In this manner, a diamond element or article of manufacture having good bonding properties is obtained to comprise a diamond substrate, a first layer bonded to said diamond substrate, a second layer bonded to said first layer and being passivated to be resistant to the attack of a halide containing gas, and a third layer of a transition element. Preferably, the second layer comprises an element different from the elements forming the first and third layers and bonds strongly with the underlying material while having the property of also bonding strongly with the material of said third layer.

As a specific example, said first layer may preferably comprise chromium which reacts with the diamond substrate to form chromium carbide, said second layer may preferably comprise titanium which has been reacted with nitrogen to form titanium nitride and said third layer may preferably comprise tungsten or molybdenum.

DESCRIPTION OF THE INVENTION

In accordance with the process of the present invention, diamond is coated with a first metal coating layer. While this layer might be any material which forms a strong bond with the carbon atoms of the diamond, for example by forming a carbide, one material which has been found to be preferable is a metal coating comprising chromium. The chromium is reacted with the diamond to produce a chromium carbide containing layer which is chemically bonded to the underlying diamond. Investigations have revealed that coating thicknesses of at least 0.05 microns is preferable to produce desirable results.

Following the deposition of the chromium layer and formation of the chromium carbide a second layer is formed and is selected to form a strong bond with the surface of the first layer and to be resistant to attack by a halide containing gas. Preferably, the second layer comprises an element different from the elements forming the first and third layers and bonds strongly with the material of said third layer. Specifically, it has been discovered that candidate materials for the second layer may be selected from the group including iron, cobalt, nickel or copper, and nitrides of titanium, vanadium, zirconium, niobium, or tantalum.

In a specific example which utilizes titanium, following the formation of the second layer, a titanium containing layer is formed on the exterior of the chromium carbide. The titanium is then passivated against reaction with a halide containing gas (such as fluorine) by nitriding the titanium. Once nitrided, a coating of a transition element such as tungsten or molybdenum, preferably tungsten, is placed on top of the titanium nitride by a chemical vapor deposition technique which exposes the particle to halide (fluorine) containing gas.

A variety of alternatives are possible for the initial deposition of the chromium layer. A first alternative is to coat the diamond surface on which the chromium is to be deposited by metal vapor deposition ("MVD"). In MVD, a layer of fine chromium powder is mixed with the diamond to be coated and then heated in a furnace for an hour or more at elevated temperatures on the order of 600°–700° C. and under an approximate $10^{-6}$ torr vacuum. This treatment causes the chromium powder to vaporize and to redeposit on the surfaces of the diamond in an even layer over the surface of the diamond. During the process, agitation may be applied to prevent the particles from adhering to one another. Chromium powder particle sizes on the order of 325 grit size are preferred. Conditioning the chromium powder with hydrogen chloride assists in the coating process. One may also perform this coating process in a methane gas atmosphere or other nonoxidizing atmosphere such as argon or hydrogen. Other deposition methods can be used to apply the first, chromium layer.

As another alternative, one may apply the chromium coating by mixing the diamond and the chromium powder in a salt bath that contains, for example NaCl, $CaCl_2$, or KCl. This combination is then soaked at about 650° C. or above for about five minutes to dissolve the chromium in the molten salt and the chromium forms a layer on the diamond crystals.

It is believed that the entire chromium layer chemically reacts with the carbon of the diamond particle to form chromium carbide ($Cr_3C_2$), bonded to the diamond. It is believed that this bond is an atom to atom bond between the carbon of the diamond and the carbide layer.

The preferred range of thicknesses for the chromium layer is between 0.05 to 1 micron. While a thickness of up to 5 microns is acceptable, 0.05 to 0.30 microns is most preferred. If the metal/carbide layer is too thin, subsequent metal coatings could diffuse to the surface of the diamond, displacing the chromium and forming weaker bonds with the diamond. 0.05 microns has been found to be about the minimum coating thickness which ensures a continuous chromium carbide coating which is adequate for bonding.

Utilizing a diamond grit with a nominal diameter of 500 microns mixed with a 99.8 percent pure chromium metal powder having an iron contamination of less than 0.1% (available from Cerac, Inc with product designation C-1221), it was found that an MVD process of from four to six hours at 720° C. and $10^{-5}$ torr, yielded chromium coatings of at least 0.05 microns. Two hours of MVD at 770° C. yielded coatings of between 0.10 and 0.40 microns. Two hours of MVD at 820° C. and 870° C. yielded coatings of between 0.03 and 0.50 microns and 0.50 to 0.80 microns, respectively. One hour of MVD at 920° C. yielded coatings of about one micron in thickness.

In the formation of the next titanium, vanadium, zirconium, niobium, or tantalum containing layer, a coating of the selected material is applied in a similar MVD process at 900° C. for six hours under a $10^{-5}$ torr vacuum. A powder of the material to be coated is mixed in a 1:1 weight ratio with diamond. 0.1 mls of concentrated HCL is added to each 3.0 gms powder and dried prior to mixing. Preferably, the coating material is deposited to a thickness equal to or exceeding 0.1 microns. It is believed that thicknesses up to 10 microns are feasible, while thicknesses greater than 10 microns are expected to crack under coating induced stresses. Furthermore, it is expected that at elevated temperatures, which may be reached during some practical applications in which the finished product might be utilized, a coating having a thickness greater than 0.1 micron might cause diffusion through the underlying chrome carbide layer to produce an attack on the diamond material itself.

Upon formation of this layer on the chromium carbide underlayer, the coated grit is then heated at about 1000° C. in a nitrogen ($N_2$) atmosphere for two hours. This heating process causes the outermost portions of the layer to combine with the nitrogen to form a nitride. Alternatively, the material may be deposited by a physical vapor deposition (sputtering) process or by a CVD process. Where the material to be deposited on the chromium carbide layer is iron, cobalt, nickel or copper, the coating process may be applied in a conventional electroless process such as is commercially available from The Richardson Company, Allied-Kelite Division. One such system is marketed under the name "Niklad 752 - Electroless Nickel-Boron System".

While titanium has proven to be an excellent choice for the intermediate or second layer, an alternative choice might be vanadium since vanadium nitride is thermodynamically more stable than titanium nitride and may, therefore, provide a better interlayer. Vanadium does not appear to form a fluoride in either the gaseous or solid phases. One experimental run was made using vanadium and while the coated grit did not perform as well in a tensile test as the titanium-nitride coated grit, it was clearly better than no interlayer.

Zirconium nitride is also an alternative. While zirconium nitride is lightly attacked by fluorine to produce an etched surface, no fluorinated solids are deposited to weaken the bond between the zirconium nitride and the subsequent layer since the reaction products between zirconium nitride and fluorine are gaseous.

Niobium nitride as an alternative is also slightly attacked by fluorine but in less degree than zirconium nitride. Like zirconium nitride, the fluorides formed are gaseous and so are carried away and do not deposit on the surface.

Tantalum nitride is also attacked by fluorine but less severely at higher temperatures. Again, the fluorides that form are volatile so they do not interfere with the coating system. A large batch and a small batch were coated and gave tensile strengths slightly lower than the embodiment having an intermediate layer of titanium nitride.

Iron, cobalt, nickel, and copper do not form nitrides but do not form fluorides either. These four, along with vanadium nitride, are best since they are not attacked by fluorine and can be scaled up to any batch size. Iron, cobalt, and nickel have the added benefit of alloying with tungsten. Bonding strength test results on coated diamond with an intermediate nickel layer have demonstrated results having strengths that are slightly less than those obtained for titanium nitride coated diamond. However, nickel has the advantage that the tensile strengths do not deteriorate with increasing batch size which tends to be the case for titanium nitride. Hence, for large batches the nickel interlayer performs much better than the titanium nitride interlayer coating.

Finally, after the second or intermediate layer is deposited, the third, outermost tungsten or molybdenum containing coating layer may be applied by a chemical vapor deposition or a physical vapor deposition technique. Metal vapor deposition is not preferred, however, because the high temperatures required in the process would tend to degrade the diamond.

The most preferred method for applying the tungsten layer is by chemical vapor deposition which involves the reduction of a metal compound (such as tungsten hexafluoride) on the surface of the coated diamond. See, for example, U.S. Pat. No. 3,757,878, to Wilder. CVD is preferred because of the ease with which a large number of pieces of diamond can be evenly coated and the relatively low temperature that can be used to deposit the tungsten. In the process of the invention, CVD is typically performed at 700° C., and 7 torr, in a reducing atmosphere for between 15 and 90 minutes. Tungsten is the preferred material for this outermost layer since tungsten bonds favorably with typical matrix materials such as cobalt and nickel and commonly used infiltration alloys such as Cu-Zn-Ni. The tungsten from this outermost layer may bond with such matrix materials by diffusion and the formation of as solid solution with the matrix material. There can also be intermetallic bonding with the matrix, depending on the matrix.

The tungsten layer is preferably between 5–50 microns thick, with coatings up to 30 microns being more preferred. Thinner coatings may be adequate depending in part on the methods and conditions of application. For example, CVD can yield a somewhat columnar tungsten coating which may be permeable to liquid alloy. The coatings must therefore be thick enough to adequately protect the inner metal layer from subsequent undesirable reactions.

EXAMPLE

Twenty pieces of ½ carat single crystal diamonds were mixed with 6 gms of a 325 mesh chromium powder. 200 gms of the chromium powder had been previously treated with 72 cc of water and 6 cc of 36% HCl for one hour, then drained and dried. The powder and diamond mixture was then processed in a tube furnace at 800° C. for one hour in a methane atmosphere. This procedure produced a uniform chromium carbide layer.

Next, the chromium carbide coated diamond was mixed with a 325 mesh titanium powder that had been treated with Hcl in a manner similar to that described above for chromium. The titanium and diamond mixture was then processed in the high vacuum furnace at 900° C. for six hours. During this time, the furnace was maintained with a vacuum of about $10^{-5}$ torr. The Ti/Cr coated diamond was then placed in a nitrogen ($N_2$) atmosphere at 1000° C. for two hours to convert the titanium containing layer at least partially into titanium nitride (TiN). While not wishing to be bound by any particular theory, it is believed that the titanium coating interacts with the carbon of the chromium carbide layer to produce an interior titanium carbide layer immediately adjacent to the chromium carbide. There may also be an intermediate, transition layer comprising titanium carbide/nitride ($Ti(C_xN_y)$) between the titanium carbide and the titanium nitride portions of this coating. While this example has illustrated an interlayer of titanium nitride, the same process can be employed with the other previously mentioned interlayer materials such as vanadium, zirconium, niobium, or tantalum. When the interlayer includes iron, nickel, cobalt or copper, the nitriding step is simply omitted.

Finally, the Cr/Ti coated diamond was placed in a CVD chamber and coated with tungsten to a thickness of 30 microns. It is believed that a thickness of 30 microns is necessary for the tungsten layer to effectively act as a diffusion barrier to the migration of elements found in common infiltration binders (such as Cu/Ni base alloy) that are commonly utilized in subsequent procedures for bonding the diamond into a tool shank. Where hot pressing is the mounting technique to be employed, rather than infiltration bonding, the tungsten layer may be as thin as 5 microns.

The above described coated half carat diamond was incorporated in the working end of the shank of a grinding wheel trueing tool. The diamond was packed in tungsten powder which was then infiltrated with a copper-zinc-nickel alloy at 1000° C. for 20 minutes in an ammonia atmosphere. When tested, the diamond was retained in the tool even after the shank in which it was mounted was abraded below the largest girth of the diamond. Un-coated diamonds or diamonds coated with the chromium containing layer and tungsten in similar conditions were plucked out of their tools when the shanks were abraded to the same degree.

What is claimed is:

1. A diamond element having good bonding properties, comprising:
   a. a diamond substrate;
   b. a first layer bonded to said diamond substrate;
   c. a second layer bonded to said first layer; and
   d. a third layer bonded to said second layer, said first layer including chromium carbide, said third layer including a transition element and said second layer including an element selected from the group consisting of titanium, vanadium, zirconium, niobium, tantalum, iron/ cobalt, nickel and copper.

2. The diamond element as recited in claim 1 wherein said second layer comprises a metal nitride.

3. An article of manufacture containing a firmly secured diamond element, said tool comprising:
a. a diamond substrate;
b. a first layer chemically bonded to said diamond substrate;
c. a second layer chemically bonded to said first layer;
d. a third layer chemically bonded to said second layer; and
e. a body bonded to said third layer, said first layer including chromium carbide, said third layer including a transition element and said second layer including an element selected from the group consisting of titanium, vanadium, zirconium, niobium, tantalum, iron, cobalt, nickel and copper.

4. The article of manufacture as recited in claim 3 wherein said second layer comprises a metal nitride.

5. A method for producing a diamond element capable of being securely bonded to a substrate, the method comprising the steps of:

a. depositing a first layer on said diamond element;
b. depositing a second layer on said diamond element; and
c. depositing a third layer on said diamond element, said first layer including chromium carbide, said third layer including a transition element and said second layer including an element selected from the group consisting of titanium, vanadium, zirconium, niobium, tantalum, iron, cobalt, nickel and copper.

6. The method as recited in claim 5 wherein said step of depositing a third layer comprises the step of depositing said tungsten or molybdenum in a chemical vapor deposition process in the presence of halide gas and wherein said second layer comprises a compound resistant to attack by said halide gas.

7. The method as recited in claim 6 wherein said step of depositing a second layer includes the step of depositing a layer of material resistant to attack by halides.

8. The method as recited in claim 5 wherein said step of depositing a second layer includes the step of passivating said second layer against attack by halides.

9. The method as recited in claim 8 wherein said passivating step includes nitridation.

* * * * *